United States Patent
Rink

[11] Patent Number: 5,931,401
[45] Date of Patent: Aug. 3, 1999

[54] BELT RETRACTOR FOR A VEHICLE SEAT BELT

[75] Inventor: Jürgen Rink, Waldstetten, Germany

[73] Assignee: TRW Occupant Restraint Systems GmbH, Alfdorf, Germany

[21] Appl. No.: 09/020,739

[22] Filed: Feb. 9, 1998

[30] Foreign Application Priority Data

Feb. 14, 1997 [DE] Germany ............... 297 02 610 U

[51] Int. Cl.$^6$ ..................... B60R 22/415; B60R 22/46
[52] U.S. Cl. ......................... 242/374; 242/382.2
[58] Field of Search ................ 242/374, 382.2, 242/382.4, 382.1, 383, 384; 280/806; 297/478, 480

[56] References Cited

U.S. PATENT DOCUMENTS

| | | | |
|---|---|---|---|
| 3,880,379 | 4/1975 | Booth | 242/382.1 |
| 4,811,912 | 3/1989 | Takada | 242/382.2 |
| 5,474,247 | 12/1995 | Bareiss | 242/382.2 |
| 5,501,293 | 3/1996 | Borjesson et al. | 280/806 |
| 5,772,145 | 6/1998 | Bareiss et al. | 242/382.2 |
| 5,794,879 | 8/1998 | Huber | 242/382.2 |

*Primary Examiner*—John M. Jillions
*Attorney, Agent, or Firm*—Tarolli, Sundheim, Covell Tummino & Szabo

[57] ABSTRACT

A belt retractor for a vehicle seat belt comprises a belt reel rotatably mounted in a housing, a webbing reeled on the belt reel, a locking mechanism for blocking belt reel rotation, a planetary gearing including a sun gear connected non-rotatably to the belt reel, a ring gear secured to the housing, and at least one planet gear having an outer toothing, as well as a switch unit for determining the buckled-up condition on the basis of the length of the unwound webbing. The switch unit may be electrically coupled to a control unit for activating a gas generator and includes a switch lever actuatable by the movement of the planet gear. The switch lever is configured as a switch rocker pivotable between a first and a second position. The planet gear comprises at least one switch cam directly engaging the switch rocker and moving the switch rocker from the first position into the second position when a predetermined length of unwound webbing is reached.

3 Claims, 6 Drawing Sheets

BELT RETRACTOR FOR A VEHICLE SEAT BELT

FIELD OF THE INVENTION

The invention relates to a belt retractor for a vehicle seat belt.

BACKGROUND OF THE INVENTION

A belt retractor known from DE-U-296 05 803 comprises a belt reel rotatably mounted in a housing, a webbing reeled on said belt reel, a locking mechanism for blocking belt reel rotation, a planetary gearing including a sun gear connected non-rotatably to said belt reel, a ring gear secured to the housing, and at least one planet gear having an outer toothing, as well as a switch unit for determining the buckled-up condition on the basis of the length of the unwound webbing. The switch unit is electrically coupled to a control unit for activating a gas generator and includes a switch lever actuatable by the movement of the planet gear.

The known belt retractor has a planet gear which is coupled to a lever via a pinion rotatably mounted on the belt reel shaft so that the pinion rotates on orbiting of the planet gear about the sun gear. A toothing of a gear rack engages the toothing of the pinion. On unwinding of the webbing the pinion rotates with the planet gear, and the gear rack is moved in one direction. This shift in position of the gear rack is sensed for determining the buckled-up condition, i.e. whether the occupant has buckled up or not, whereby as of a predetermined length of the webbing unwound it is assumed that the occupant present in the vehicle seat assigned to the belt reel has in fact buckled up. It is only when the switch unit is actuated that the control unit activates in a restraint situation a gas generator which is part of a belt tensioner or a gas bag restraint system. Since the position of the gear rack is sensed via a spring-loaded switch lever in contact with the latter a relatively long path of force transmission materializes via numerous parts. These parts need to be in contact with each other at best with zero clearance so that reliable actuation of the switch unit is assured.

BRIEF SUMMARY OF THE INVENTION

The invention provides a belt retractor of simple, compact configuration in which the force transmission from the planet gear up to the switch unit occurs more directly than in the case of the known belt retractor. The belt retractor according to the invention comprises a belt reel rotatably mounted in a housing, a webbing reeled on the belt reel, a locking mechanism for blocking belt reel rotation, a planetary gearing including a sun gear connected non-rotatably to the belt reel, a ring gear secured to the housing, and at least one planet gear having an outer toothing, as well as a switch unit for determining the buckled-up condition on the basis of the length of the unwound webbing. The switch unit may be electrically coupled to a control unit for activating a gas generator and includes a switch lever actuatable by the movement of the planet gear. The switch lever is configured as a switch rocker pivotable between a first and a second position. The planet gear comprises at least one switch cam directly engaging the switch rocker and moving the switch rocker from the first position into the second position when a predetermined length of unwound webbing is reached.

The belt retractor in accordance with the invention does not provide the gear rack and the pinion needed for actuating the latter as required in the prior art. Instead, the planet gear directly engages a switch rocker via a switch cam so that less room is required for the switch unit as a whole in both the axial and radial direction.

After having moved from the first position into the second position, the switch rocker needs to be returned to the first position when the belt is released. This can be achieved again by the switch cam provided on a planet gear in accordance with the preferred embodiment of the invention. For this purpose the same switch cam can be used which also actuates the switch rocker on unwinding of the webbing, or a second switch cam may be provided on the same or a second planet gear.

The switch rocker may itself be configured as a switch unit or it can actuate a switch arranged adjacent to it, this switch being electrically connectable to the control unit. In this latter case the switch comprises preferably a switching plunger engaging the switch rocker.

Speedy, simple assembly is achieved by the switch being configured as a preassembled unit with a switch housing secured to the belt retractor by a snap connection.

In the preferred embodiment of the belt retractor in accordance with the invention the belt retractor comprises an activating mechanism having a control disk restrictedly rotatable relative to the belt reel, by the rotation of which relative to the belt reel the locking mechanism is activatable. Furthermore, a deactivating means having a second switch rocker is provided which in a first switch position blocks the control disk and, thus, the locking mechanism. This deactivating means, also known as a child safety lock, serves to actuate the locking mechanism so that a child seat is secured non-shiftable to a vehicle seat. The configuration of the second switch rocker corresponds preferably substantially to that of the first switch rocker and is also moved by at least one switch cam on a planet gear from the first switch position into the second switch position and back again. The constructive expenses for the deactivating means and the switch unit is minimized by being able to employ the same planetary gearing for actuating almost identical switch rockers.

DETAILED DESCRIPTION OF PREFERRED EMBODIMENTS

Figure 1:
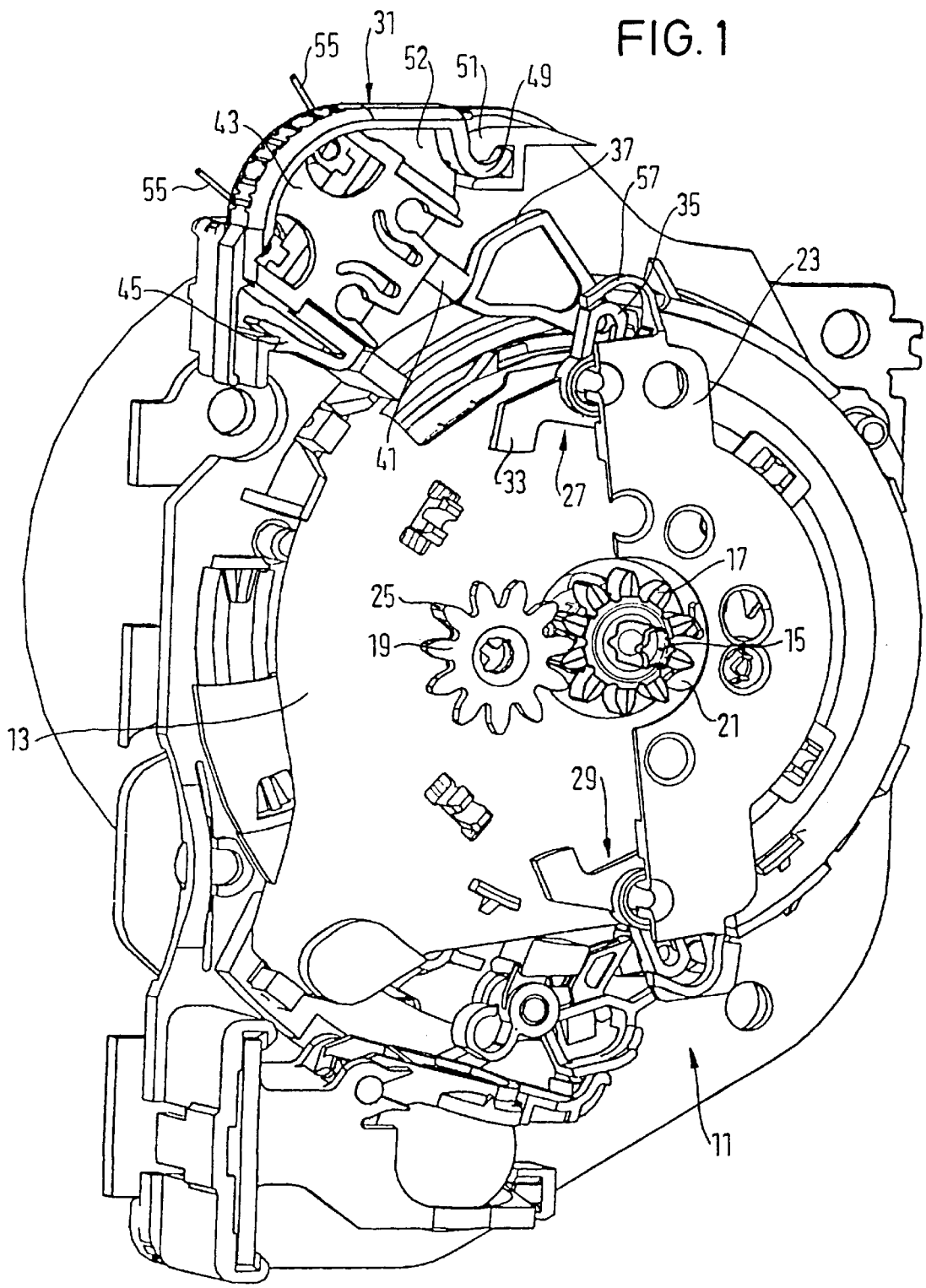
FIG. 1 is a side view of the control side of the belt retractor in accordance with the invention with the switch unit not actuated.

In the following only the so-called control side of the belt retractor in accordance with the invention is described since all remaining components are configured conventionally. The belt retractor comprises a belt reel rotatably mounted between the legs of a U-shaped frame. Furthermore, a locking mechanism 11 is provided which responds to a vehicle-sensitive and web-sensitive activating mechanism and locks the belt reel in a load-bearing manner in case of emergency. In FIG. 1 a cover 13 covers an actuating disk, a coupling disk as well as a control disk as part of an activating mechanism by means of which the belt reel can be locked in a restraint situation. Arranged on the outer side of the cover 13 is a planetary gearing. The latter comprises a sun gear 17 connected non-rotatably to the belt reel, of which only an an axially protruding mounting pin 15, pressed into place, is evident, two planet gears 19, 21 as well as an inner toothed ring gear 23 formed in a covering cap, of which only the right-hand half is shown. The planet gears 19, 21 are provided with switch cams, of which only the switch cam 25 is shown in FIG. 1, in the form of teeth elongated axially relative to the remaining teeth. The switch cams actuate two switch rockers, namely a first switch rocker 27 and a second switch rocker 29. The switch rockers 27, 29 are swivably mounted on the inner side of the ring gear 23 and are able to assume two stable switching positions.

The switch rocker 27 is part of a switch unit which, furthermore, comprises a switch 31. The switch rocker 27 has two actuating arms, of which only the left-hand actuating arm 33 is evident in FIG. 1. A latching arm 35 integrally molded to the switch rocker 27 extends radially outwards. In turn, a switching arm 37, arranged offset from the latching arm and axially to the rear, protrudes from the latching arm. A switching plunger 41 of the switch 31 is in spring-loaded contact with a control surface 39 of the switching arm 37, said surface being oriented radially outwards.

The switch 31 is configured as a preassembled unit comprising a switch housing 43 which can be secured to the belt retractor by a snap connection 45. On the side opposite the snap connection 45 the switch housing 43 has an arcuate protrusion 49 engaging a mounting pin 51 on the right-hand 52 so that a kind of swivel bearing materializes. For fitting the switch 31 from without, the switch 31 is inserted by its protrusion 49 first, into the retractor housing 52 (not shown fully) surrounding the control side and then swivelled about the mounting pin 51 in the direction of the sun gear 17 until the snap connection 45 snaps into place in the retractor housing 52. The switch 31 is coupled via an electrical wire 55, on the one hand, to a control unit, which is not part of the belt retractor, and, on the other hand, to an igniter of a gas generator. This gas generator is part of a belt tensioner or serves to deploy a gas bag (both of which are not shown). In a restraint situation the control unit activates via the wire 55 the gas generator, when the switch 31 is in the ON position in which the wire 55 conducting the ignition current is not open-circuited. In the position shown in FIG. 1 the switch 31 is in the OFF position, however, since no webbing has yet been unwound.

Figure 2:
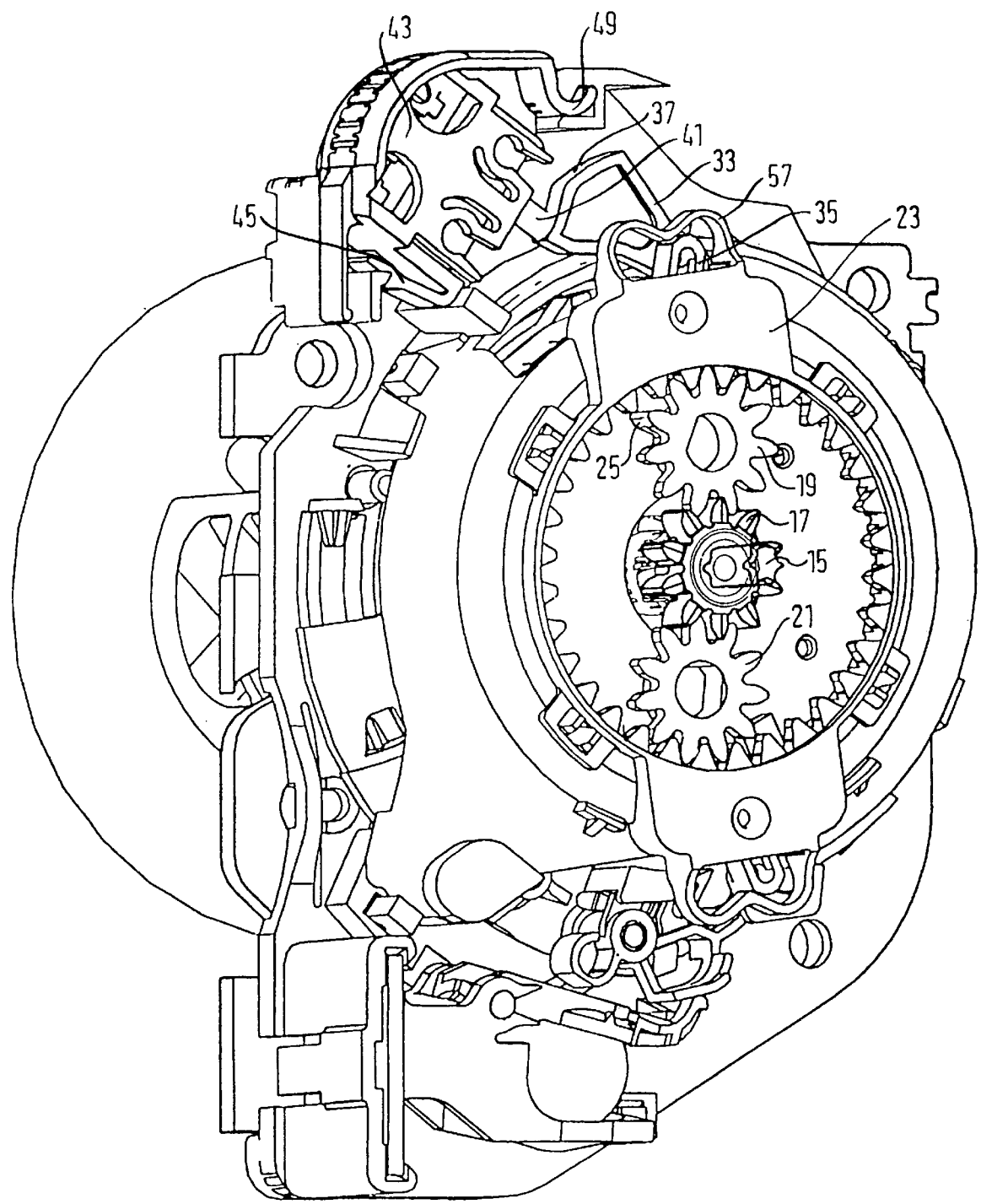
FIG. 2 is a perspective view of the control side of the belt retractor shown in FIG. 1 in accordance with a first embodiment with the ring gear shown in a partial view.
Figure 3:
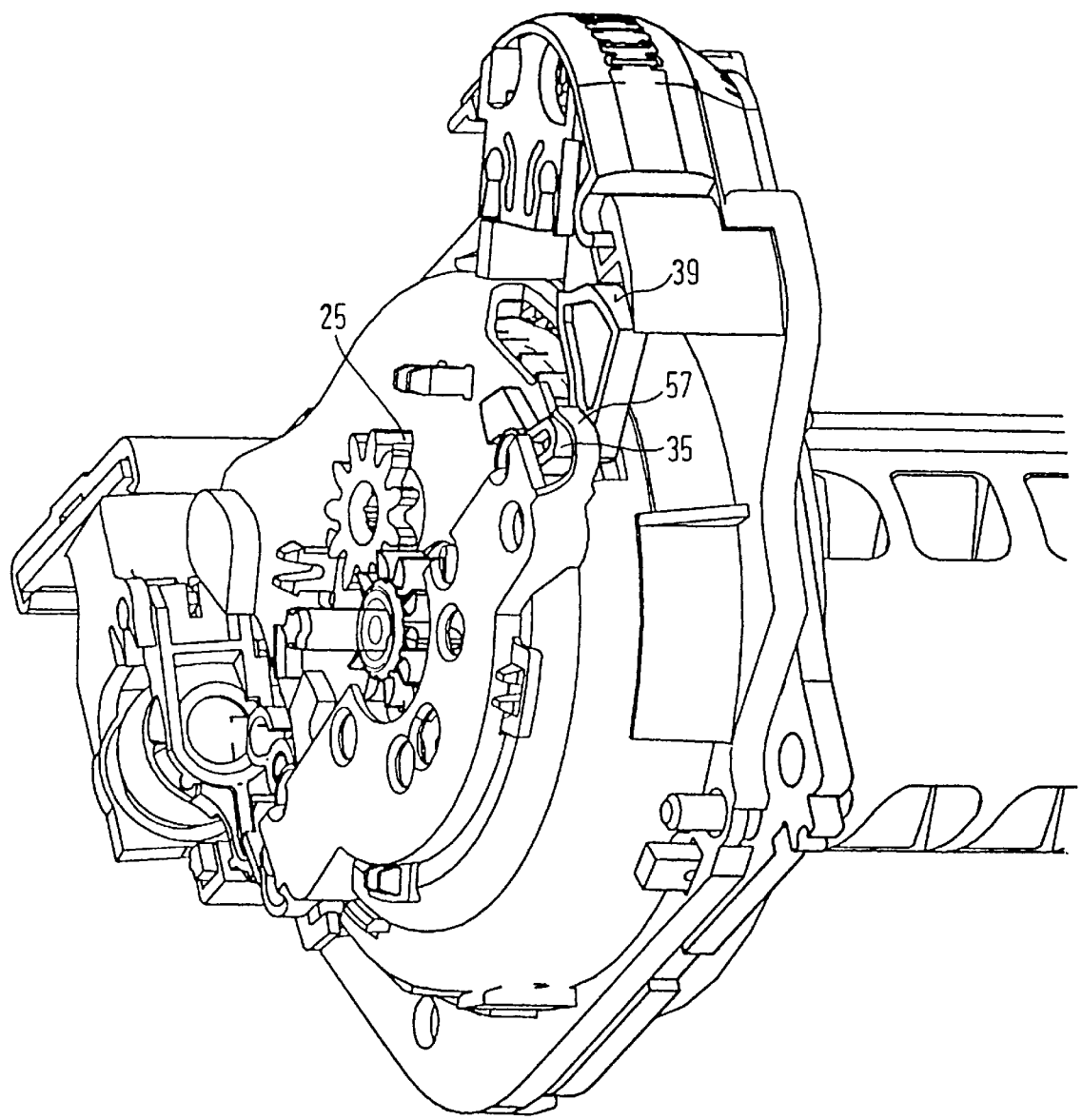
FIG. 3 is a perspective view of the control side of the belt retractor in accordance with the invention, the plane corresponding to that of FIG. 1.
Figure 4:
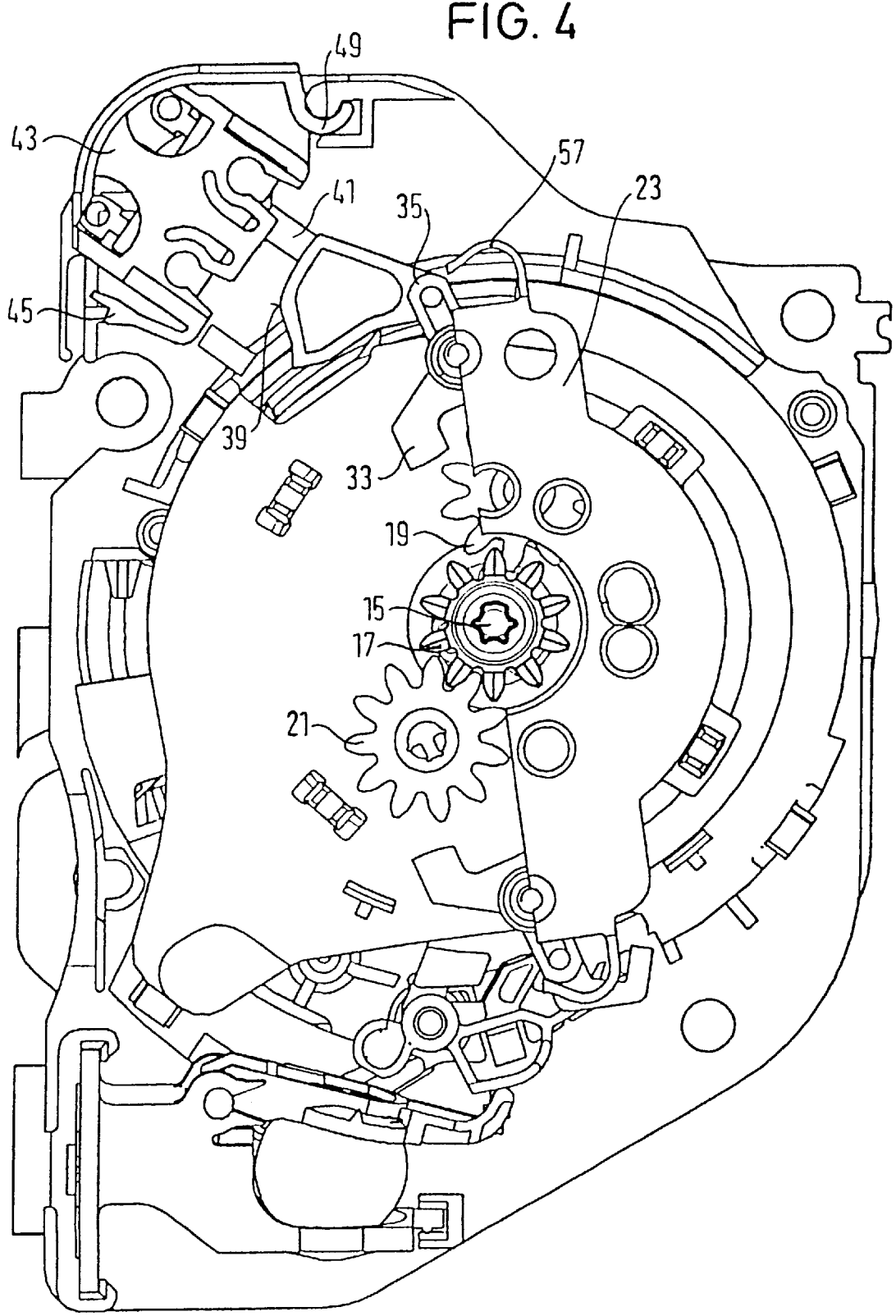
FIG. 4 is a view of the belt retractor as shown in FIGS. 1 to 3 with the switch unit actuated, the plane corresponding to that of FIG. 1.
Figure 5:
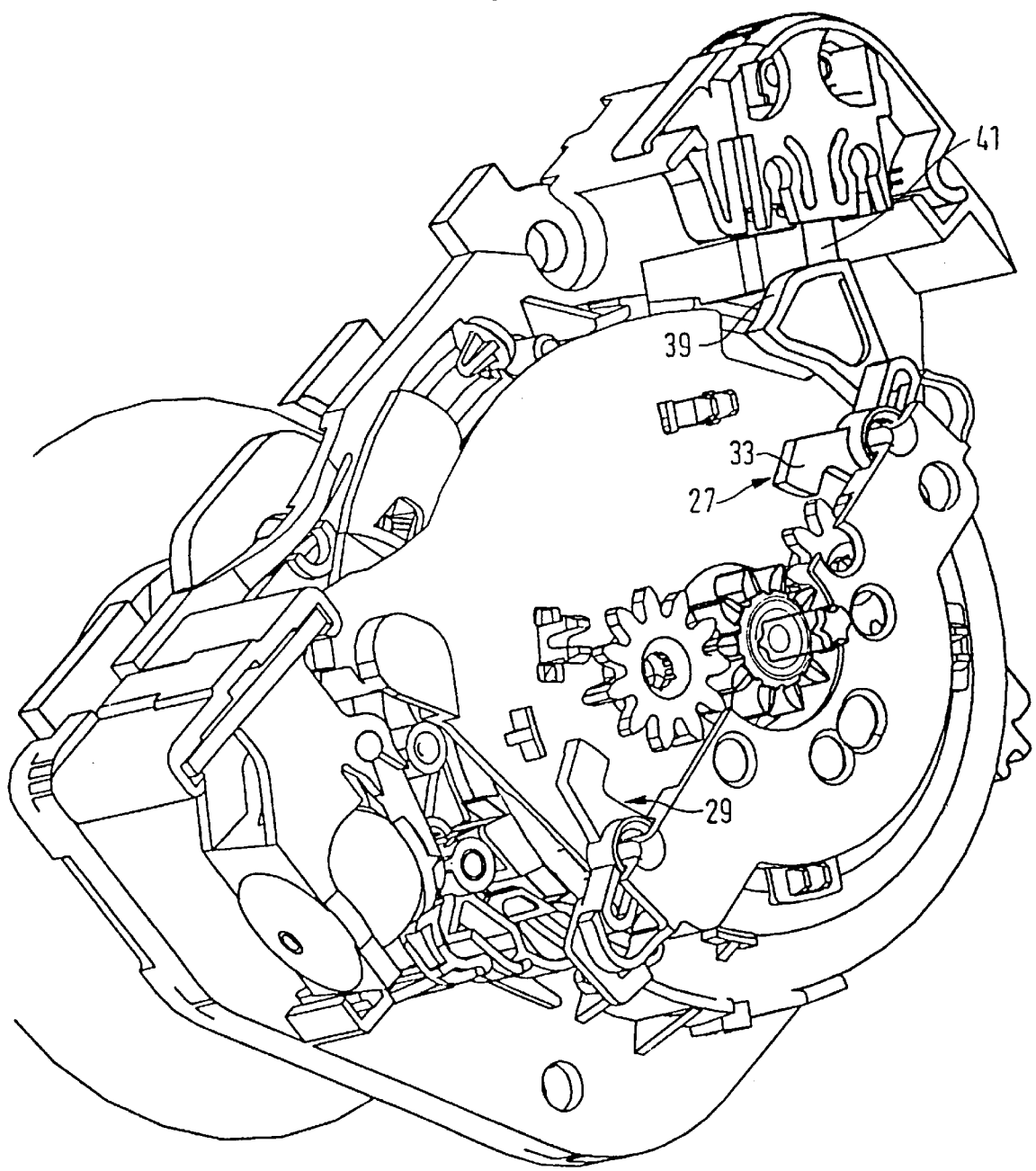
FIG. 5 is a perspective view of the belt retractor in accordance with the invention with the switch unit actuated, the plane corresponding to that of FIG. 1.

The switch rocker 27 is able to assume two stable switch positions, namely the first position shown in FIG. 1 (OFF position) and a second position (ON position) swivelled opposite the latter counter-clockwise. To stabilize the switch rocker 27 in both positions a spring element 57 is provided formed integrally on the ring gear 23 and consisting of two adjacent arcuate sections (cf. FIG. 2), each arcuate section of the spring element 57 being assigned to one position of the switch rocker 37 and surrounding the latching arm 35 in this position. When the switch rocker 27 is swivelled from the first position into the second position the latching arm 35 (cf. FIG. 2) deforms the intermediate web between both arcuate sections and accesses the region of the left-hand section.

Figure 6:
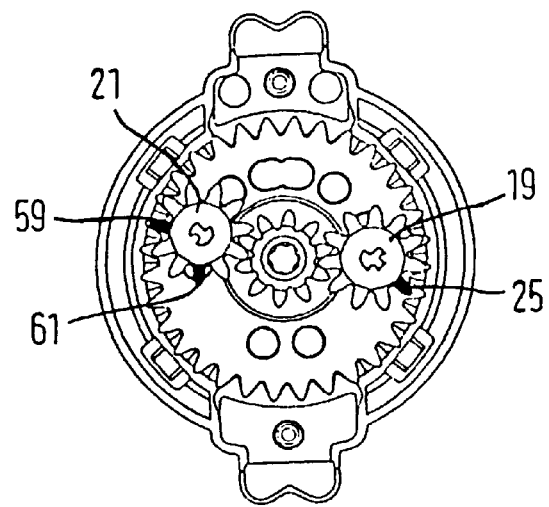
FIG. 6 is a view of the control side of the belt retractor in accordance with the first embodiment of the invention with the switch cams identified separately.

Switch cams are provided on the planet gears 19, 21 for swivelling the switch rocker 27. These switch cams are formed by extra-wide teeth on the planet gears 19, 21. The planet gear 19 comprises one switch cam 25 and the planet gear 21 two switch cams 59, 61 (see FIG. 6).

The second switch rocker 29 is part of a deactivating means which blocks the control disk and thus the locking mechanism whenever the webbing has been unwound almost completely so that the webbing merely can be wound up, enabling a child seat to be secured without play by the webbing on the vehicle seat. The configuration of the second switch rocker 29 corresponds to that of the first switch rocker 27, merely the switching arm 37 being configured differently and actuating a member for blocking the control disk. The second switch rocker 29 is disposed diametrically opposed to the sun gear 17 of the first switch rocker 27.

When the seat belt is not fastened the switch rockers 27, 29 are in the starting position shown in FIG. 1. As soon as the webbing has been unwound for a predetermined length, the switch cam 59 comes up against the right-hand actuating arm of the switch rocker 27 (not shown in FIG. 1) and swivels it counter-clockwise so that the switching plunger 41 is urged outwards and the switch 31 accesses the ON position. As a result of this, the control unit is able to output a pulse or ignition current to the gas generator in a restraint situation via the lead 55 and the interposed switch 31 and to ignite a gas generant. Due to the spring element 57 the switch rocker 29 is retained stable in the second position.

As soon as webbing has been unwound for a minor length the switch cam 59 comes into contact with the switch rocker 27 and actuates it. Following actuation of the switch rocker 27 the planet gear 19 moves until the webbing is fastened. Once the belt is fastened the switch rocker 29 remains in the position shown in FIG. 1 in which the deactivating means not yet blocks the control disk. As a result of this, both vehicle-sensitive and webbing-sensitive actuation of the locking mechanism of the belt retractor is possible.

If a child seat is to be fitted, the webbing is first unwound almost completely, the switch cam 59 thereby coming into contact with the right-hand actuating arm of the switch rocker 29 swivelling it clockwise so that the deactivating means blocks the control disk and the webbing can only be wound up and no longer unwound.

When the seat belt has been released and is wound up by the belt retractor the switch cam 25 of the planet gear 19 comes up against the switch rocker 29 swivelling it back into the first position. Furthermore, the switch cam 61 comes up against the actuating arm 33 and swivels the switch rocker 27 into the first position in which the switch 31 is in the OFF position and the wire 55 open-circuited. As a result of this the control unit is no longer able to activate the gas generator in a restraint situation which, however, is also no longer necessary since the vehicle seat assigned to the belt retractor is not occupied.

Figure 7:
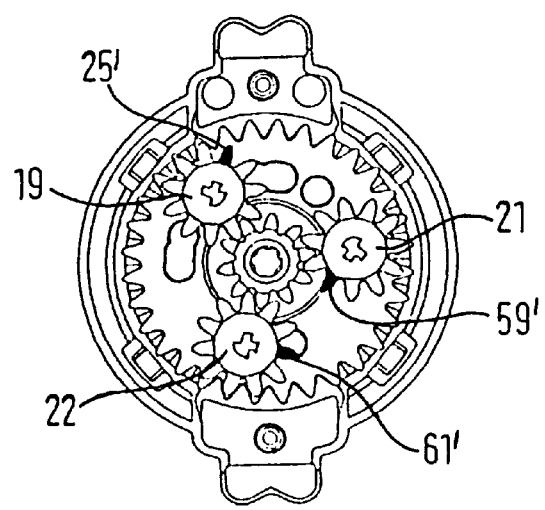
FIG. 7 is a view of the control side of the belt retractor in accordance with the second embodiment of the invention with three planet gears.

The embodiment shown in FIG. 7 corresponds substantially to that shown previously except that instead of two, three planet gears 19, 21, 22 are provided. Each planet gear 19, 21, 22 is provided with a switch cam 25', 59', 61' actuating one of the two switch rockers 27, 29 at a predetermined length of unwound webbing. In this arrangement the switch cam 59' on the planet gear 21 serves to transfer the switch rocker 27 from the first position into the second position. The switch cam 61' on the planet gear 22 swivels the switch rocker 27 back into the first position. Furthermore, it actuates the switch rocker 29 moving it from the first position into the second position. The switch rocker 29 is transferred from this second position back into the first position by the switch cam 25' coming up against the planet gear 19.

I claim:

1. A belt retractor for a vehicle seat belt, comprising:

a belt reel rotatably mounted in a housing, a webbing reeled on said belt reel, a locking mechanism for blocking belt reel rotation, a planetary gearing including a sun gear connected non-rotatably to said belt reel, a ring gear secured to said housing, and at least one planet gear having an outer toothing, and a switch unit for determining the buckled-up condition on the basis of the length of the unwound webbing, said switch unit being electrically connectable to a control unit for activating a gas generator and includes a switch lever actuatable by the movement of said planet gear, said switch lever being configured as a switch rocker pivotable between a first and a second position, and said planet gear comprising at least one switch cam directly engaging said switch rocker and moving said switch rocker from said first position into said second position when a predetermined length of unwound webbing is reached, said switch unit comprising a switch arranged adjoining said switch rocker, said switch being electrically connectable to said control unit, and said switch comprising a switching plunger engaging said switch rocker, said switch being configured as a preassembled unit and comprising a switch housing secured to said belt retractor by a snap connection.

2. A belt retractor for a vehicle seat belt, comprising:

a belt reel rotatably mounted in a housing, a webbing reeled on said belt reel, a locking mechanism for blocking belt reel rotation, a planetary gearing including a sun gear connected non-rotatably to said belt reel, a ring gear secured to said housing, and at least one planet gear having an outer toothing, a switch unit for determining the buckled-up condition on the basis of the length of the unwound webbing, said switch unit being electrically connectable to a control unit for activating a gas generator and includes a switch lever actuatable by the movement of said planet gear, said switch lever being configured as a switch rocker pivotable between a first and a second position, and said planet gear comprising at least one switch cam directly engaging said switch rocker and moving said switch rocker from said first position into said second position when a predetermined length of unwound webbing is reached, and a stationary spring element which engages said switch rocker and tends to maintain said switch rocker in its present position, said spring element being a protrusion molded to said ring gear and said switch rocker comprises a latching arm which is engaged by said spring element in both positions.

3. A belt retractor for a vehicle seat belt, comprising:

a belt reel rotatably mounted in a housing, a webbing reeled on said belt reel, a locking mechanism for blocking belt reel rotation, a planetary gearing including a sun gear connected non-rotatably to said belt reel, a ring gear secured to said housing, and at least one planet gear having an outer toothing, a switch unit for determining the buckled-up condition on the basis of the length of the unwound webbing, said switch unit being electrically connectable to a control unit for activating a gas generator and includes a switch lever actuatable by the movement of said planet gear, said switch lever being configured as a switch rocker pivotable between a first and a second position, and said planet gear comprising at least one switch cam directly engaging said switch rocker and moving said switch rocker from said first position into said second position when a predetermined length of unwound webbing is reached, an activating mechanism having a control disk restrictedly rotatable relative to said belt reel, by rotation of said control disk relative to said belt reel the locking mechanism being activatable, and a deactivating means having a second switch rocker which blocks said control disk and, thus, said locking mechanism in a first switch position, wherein the configuration of said second switch rocker corresponds substantially to that of said first switch rocker and is moved by at least one of said switch cams on one of said planet gears from said first switch position into said second switch position and back again, and wherein the same switch cam actuates both said first and said second switch rockers.

* * * * *